United States Patent [19]

Stalego

[11] 4,046,535
[45] Sept. 6, 1977

[54] GLASS MELTER HAVING REFLECTIVE TOP WALL AND METHOD FOR USING SAME

[75] Inventor: Charles J. Stalego, Newark, Ohio

[73] Assignee: Owens-Corning Fiberglas Corporation, Toledo, Ohio

[21] Appl. No.: 616,119

[22] Filed: Sept. 24, 1975

Related U.S. Application Data

[63] Continuation of Ser. No. 463,472, April 24, 1974, abandoned.

[51] Int. Cl.² .................................................. C03B 37/02
[52] U.S. Cl. .................................................. 65/1; 13/6;
65/2; 65/135; 65/337; 65/345; 65/356;
65/DIG. 4
[58] Field of Search ............... 65/1, 2, 337, DIG. 4,
65/345, 356, 136, 135; 13/6

[56] References Cited

U.S. PATENT DOCUMENTS

| | | | |
|---|---|---|---|
| 1,880,541 | 10/1932 | Wadman | 13/6 X |
| 2,255,578 | 9/1941 | Baker | 13/6 |
| 3,294,503 | 12/1966 | Machlan et al. | 65/1 |
| 3,628,930 | 12/1971 | Harris | 65/136 X |

*Primary Examiner*—Robert L. Lindsay, Jr.
*Attorney, Agent, or Firm*—John W. Overman; Ronald C. Hudgens; Ted C. Gillespie

[57] ABSTRACT

Method of and apparatus for supplying streams of molten glass including: a feeder with a chamber having an opening for supply of glass marbles for conversion to a molten body; a bottom wall for the chamber having orifices for discharging the molten glass as streams; means for heating the feeder; and a surface above the molten glass effective to reflect radiation so that reflected radiation is concentrated in a chamber where unmelted glass is present during melting.

6 Claims, 12 Drawing Figures

U.S. Patent  Sept. 6, 1977  Sheet 2 of 4  4,046,535
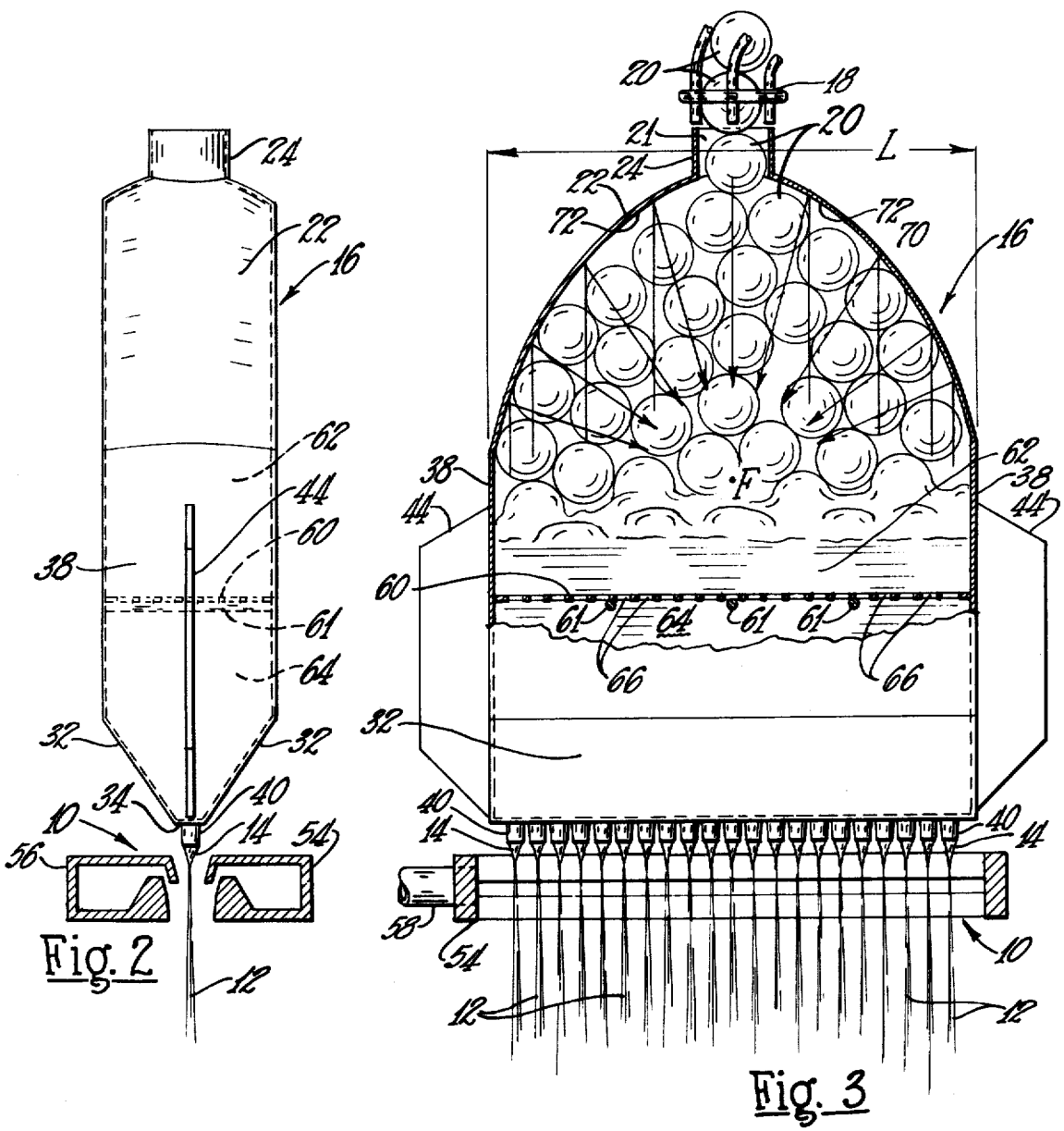
Fig. 2
Fig. 3
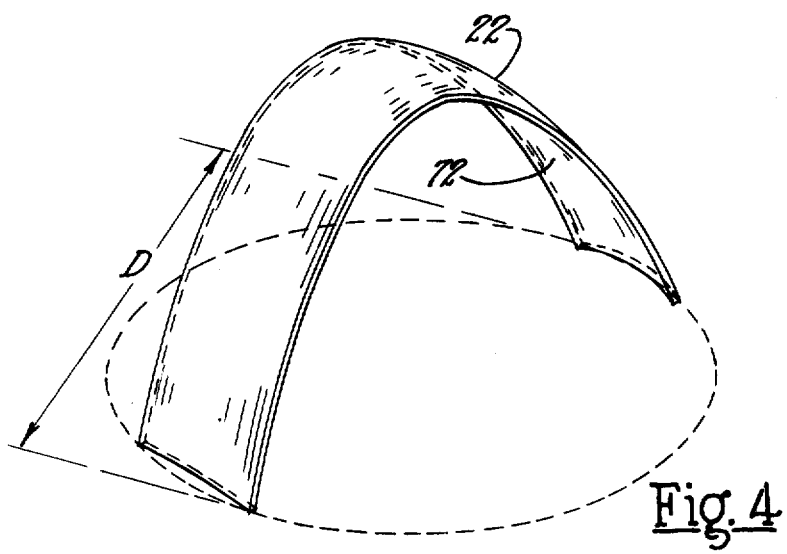
Fig. 4

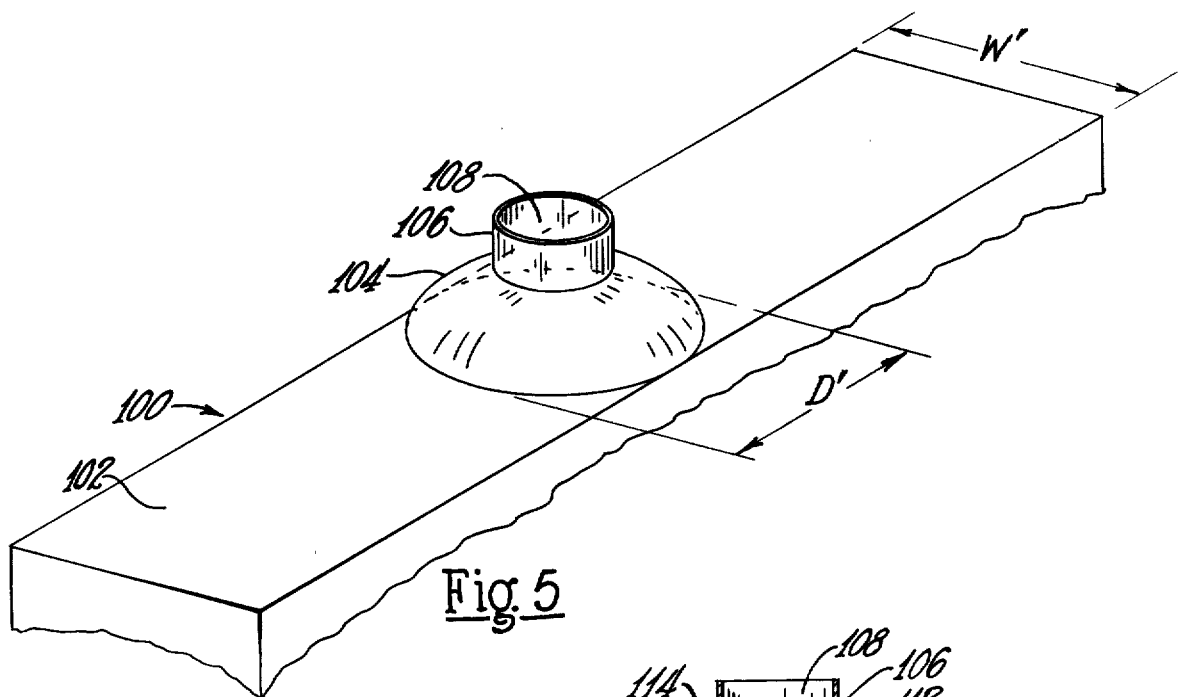
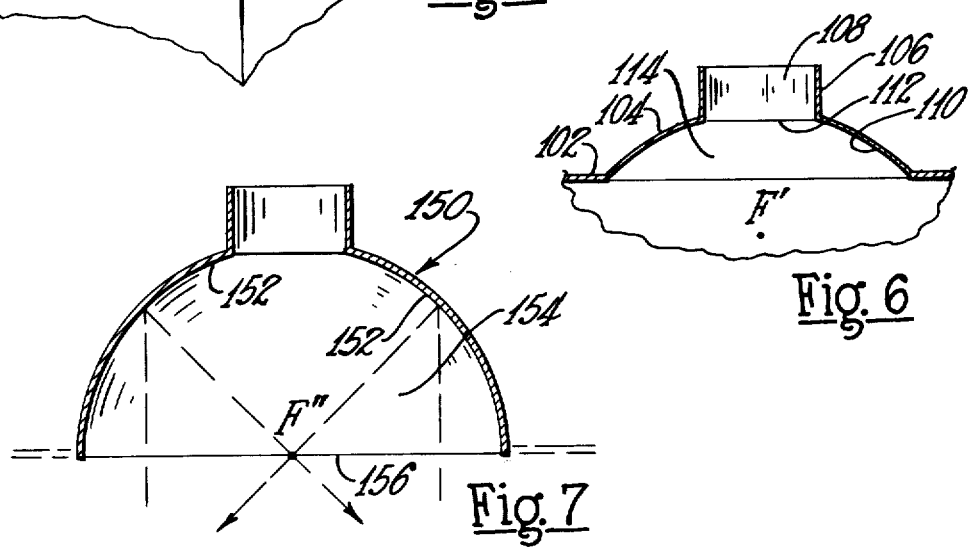

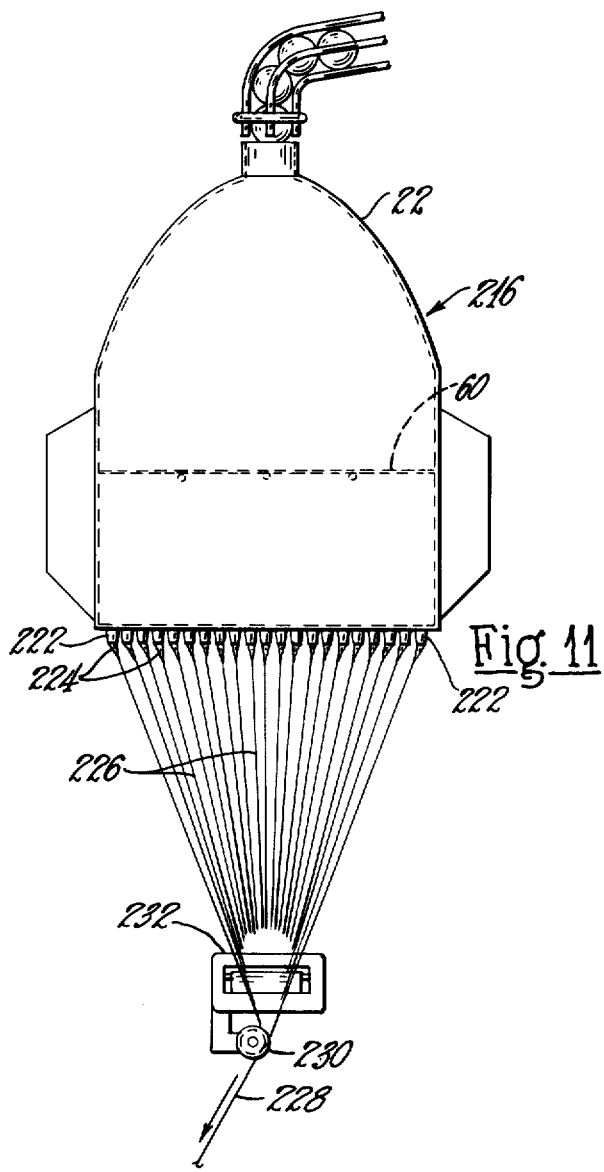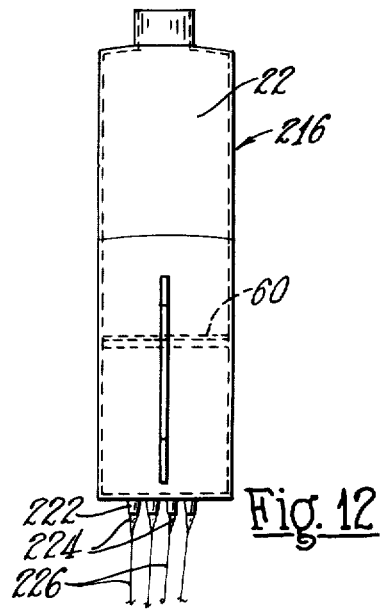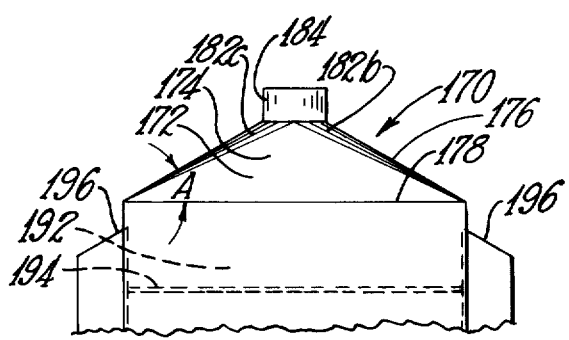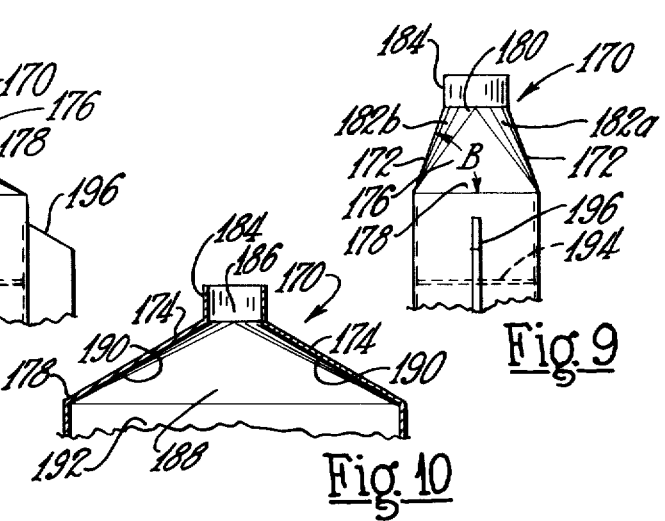

GLASS MELTER HAVING REFLECTIVE TOP WALL AND METHOD FOR USING SAME

This is a continuation of application Ser. No. 463,472, filed Apr. 24, 1974, now abandoned.

BACKGROUND OF THE INVENTION

One type of glass filament forming process uses an electrically heated stream feeder that is fed glass marbles. The heated feeder melts these marbles into a body of molten glass primarily by conduction and radiation and discharges the molten glass as streams. Mechanical or fluid means can be used to attenuate the streams into glass filaments.

Competition in glass filament products demands a great deal from marble melting stream feeders. Economic conditions call for marble melting stream feeders that provide increased molten glass throughput to increase glass filament production. And a more demanding community of glass filament product users calls for uniform filament size in products.

But the goals of both increased production rates and uniform filament size from marble melt stream feeders conflict with each other. Of course, more feeders will increase glass filament production. But these feeders are normally made from expensive platinum alloys. Therefore greater melting capacity for conventional small stream feeders presents a more attractive choice.

Melting glass marbles by a stream feeder is a complex and sensitive operation that directly affects the quality of glass filaments produced, especially at higher production rates. For example, introduction of glass marbles to a feeder has a chilling effect that disturbs the temperature pattern of molten glass in the feeder. This disturbance causes viscosity variations in the molten glass streams discharged from the feeder. These viscosity differences produce glass filaments having undesirable nonuniform diameter variations along their lengths. And these nonuniformities tend to become even more pronounced with attempts at higher production rates.

SUMMARY OF THE INVENTION

An object of the invention is improved method of and apparatus for producing filaments of heat-softened filament forming material such as glass.

Another object of the invention is improved method of and apparatus for processing heat-softenable filament forming material such as glass so that filaments produced have a more consistent size.

Still another object of the invention is an improved stream feeder capable of greater throughput of heat-softenable mineral filament forming material such as glass.

Yet another object of the invention is an electrically heated stream feeder making more complete use of radiation to reduce temperature variations in molten material held by it during filament forming operations.

These and other objects are obtained by a stream feeder including: a chamber having an opening for supplying unmelted mineral material for conversion to a molten body; a bottom wall for the chamber having at least one orifice for discharging the molten material as a stream; and means for heating the feeder to convert the mineral material to the molten body. A surface is above the molten body to reflect radiation so that the reflected radiation is concentrated at a predetermined region in the chamber to promote more uniform temperatures within the feeder and to promote increased melting rates in the feeder.

The above and other objects and advantages will become more apparent as the invention is described in more detail with reference made to the accompanying drawings.

DESCRIPTION OF THE DRAWINGS

FIG. 2 is an end elevation of the feeder and blower of FIG. 1. A blower below the feeder directs gaseous blasts that attenuate glass filaments from molten glass streams emitted from the feeder. The blower is shown in section.

FIG. 3 is a front elevation of the feeder and blower of FIGS. 1 and 2. The feeder is illustrated in section to show the radiation reflecting characteristics of the feeder.

FIG. 4 more fully shows the construction and shape of the cover or top wall for the feeder shown in FIGS. 1-3.

FIG. 5 is an isometric projection of the upper portion of another glass stream feeder according to the principles of the invention.

FIG. 6 is a section of the radiation reflecting portion of the feeder shown in FIG. 5.

FIG. 7 is a section of a hemispherical radiation reflecting chamber for a stream feeder according to the principles of the invention.

FIG. 8 is a front elevation of the upper portion of another glass stream feeder according to the principles of the invention.

FIG. 9 is a front elevation section of the upper portion of the glass stream feeder shown in FIG. 8.

FIG. 10 is an end elevation of the radiation reflecting chamber of the feeder of FIGS. 8 and 9.

FIG. 11 is a front elevation of apparatus for producing a glass strand. The apparatus uses a glass stream feeder similar to the stream feeder shown in FIGS. 1-3.

FIG. 12 is an end elevation of the glass stream feeder shown in FIG. 11.

DESCRIPTION OF THE PREFERRED EMBODIMENTS

Figure 1:
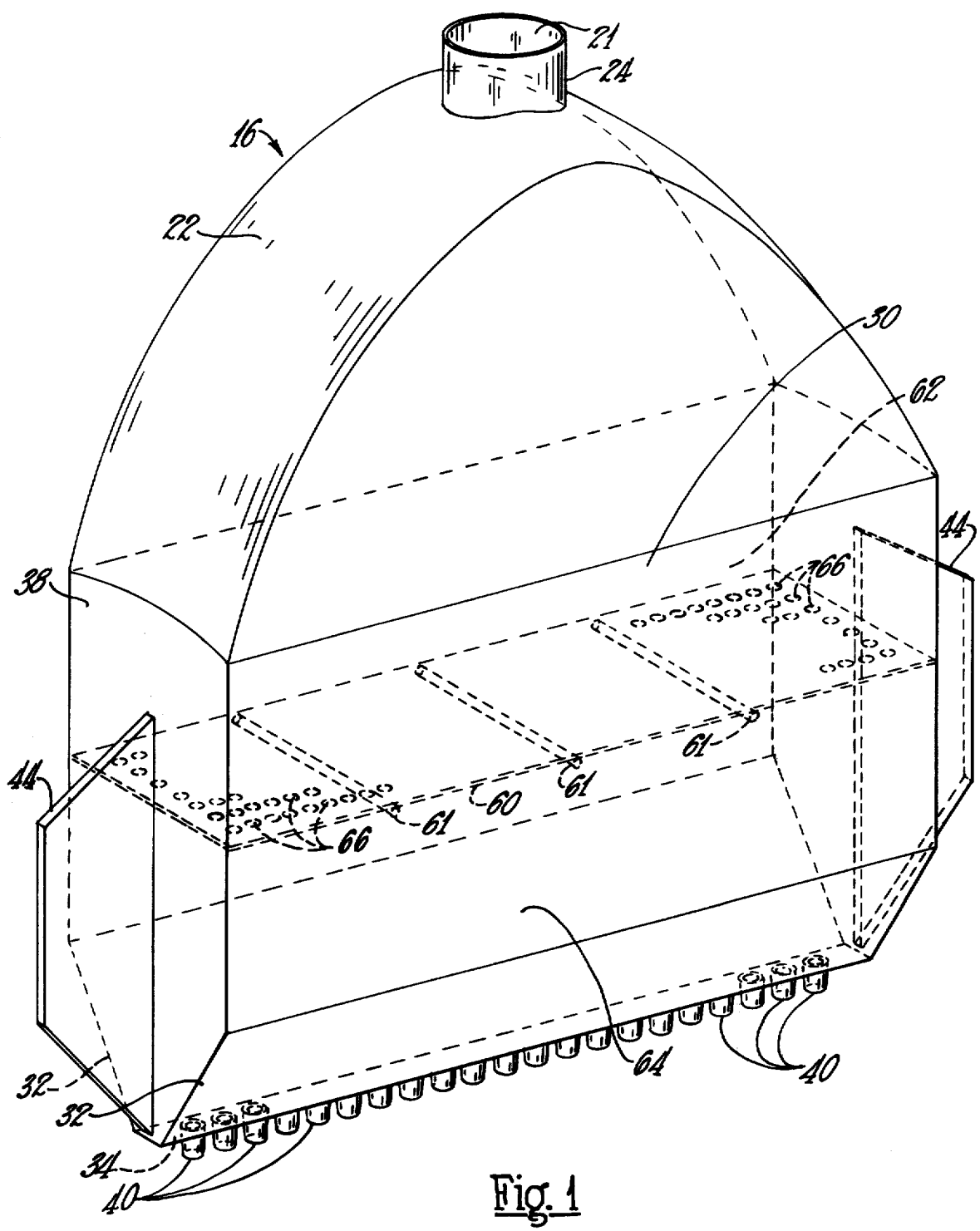
FIG. 1 is an isometric projection of a marble melting glass stream feeder according to the principles of the invention.

The method and apparatus of the invention are particularly valuable in processes for forming filaments from heat-softenable filament forming mineral material such as glass. But the invention is also generally useful in operations for forming filaments from other thermoplastic filament forming material such as nylon, polyester and polyethylene. So it is to be understood that disclosure of the invention in a glass filament forming operation is only an example to explain the operation of the invention.

FIGS. 1-3 show a glass filament forming operation using gaseous blasts from a blower 10 to attenuate glass filaments 12 from molten glass streams 14. A stream feeder 16 made of electrically conductive and high temperature resistant material, such as an alloy of platinum, discharges the streams 14.

A chute 18 (FIG. 3) supplies radiation pervious glass marbles 20 to the feeder 16. The marbles 20, which are normally clear, enter the feeder through supply passageway or opening 21 in its roof or top wall 22. As shown in FIGS. 1-3 an upstanding tubular member 24 on the roof 22 defines the marble supply opening 21.

The chute 18 connects with a suitable source of marbles, such as marble holding hoppers not shown in the drawings.

The feeder 16 includes: vertical side walls 30; converging sidewalls 32; a bottom wall 34 and vertical end walls 38.

The bottom wall 34 has orifice openings or passageways for delivering the streams 14 of molten glass from the feeder 16. As shown one straight row of depending orificed projections or tubular members 40 form the orifice openings.

Electric terminals 44 are on the end walls 38 of the feeder 16. These terminals connect to a source of electrical energy effective to heat the feeder 16 by conventional resistance heating. The electrically heated feeder 16 melts glass marbles 20 supplied to it to form a body of molten glass. The molten glass held in the feeder 16 discharges through its orificed projections 40 as the streams 14.

Below the feeder 16 is the slotted blower 10 that releases blasts of gaseous fluid for attenuating the molten glass streams into the glass filaments 12. The blower 10 is an assembly including opposed blower halves 54 and 56; each of these halves includes a row of jet or nozzle openings. And each of the blower halves is supplied suitable fluid under pressure (for example, steam, air or other gaseous blowing media) from a source through a supply tube (such as supply tube 58 shown in FIG. 3). The blower 10 releases the blowing fluid supplied to it as downwardly directed blasts effective to attenuate the streams 14 downwardly into the filaments 12. U.S. Pat. No. 2,206,060 describes a suitable blower for use in attenuating the streams 14.

In practice refractory material surrounds the feeder 16 to reduce heat loss during filament forming operations. But for ease of discussion and illustration the figures do not show the refractory.

The feeder 16 includes an internal heating strip or element 60 for melting the glass marbles 20. As shown the heating strip 60 is a thin horizontally disposed planar or sheet-like member. It is joined to the end walls 38 and sidewalls 30 to divide the interior chamber of the feeder 16 into an upper marble melting space or region 62 and a lower reservoir space or region 64 for molten glass. Molten glass in the lower region 64 below the heating strip 60 leaves the feeder 16 through the orificed projections 40 to emerge as the streams 14. Other shaped heating elements can be used.

The heating strip 60, like the walls of the feeder, is normally made of platinum or an alloy of platinum. But the strip 60 is usually thicker than the walls of the feeder 10. So when the feeder 16 is electrically energized through the terminals 44, the heater strip 60 is also energized. And it becomes hotter than the walls of the feeder 16.

The strip 60 is perforated to have small openings or holes 66 so that molten glass above the strip 60 from melted marbles can flow downwardly into the lower reservoir section 64 below the strip 60. The openings 66 are small enough so that molten glass moving through them is at desired filament attenuation viscosities (temperatures). Higher viscosity portions of the marbles 20 are thereby discouraged from moving downwardly into the lower reservoir section 64. Normally the openings 66 are in the range of from 3/16 to 1/32 of an inch from normal operating temperature range of from 2350° to 2450° F used in most blower attenuation processes.

Members 61 below the heating strip 60 provide support for it.

The heater strip 60 is located sufficiently below the supply opening 20 to allow the marbles 20 to accumulate in stacked relationship above the strip. Therefore marbles nearer the bottom of the stack and closer to the hot electrically heated strip 60 melt first. As marbles move progressively downwardly in the stack, they become hotter and hotter. They begin fusing or merging together to take on more the form of a molten body of glass. Finally a homogenous body of molten glass is formed in the region immediately above the heating strip 60.

The electrically heated walls and heater strip 60 of the feeder 16 and the molten body of glass in the feeder are all exceedingly hot. So they all emit radiant energy. Therefore, during filament forming operations radiation is being emitted throughout the interior of the feeder 16. And such radiation is primarily in the infrared frequency range, but also includes other frequencies, for example, visible light.

The top wall 22 is shaped to form a marble entrance or radiation reflecting chamber 70 within the feeder 16 immediately above the marble melting region 62. The interior or ceiling surface 72 of the top wall 22 (chamber 70) is a concave reflecting surface. It is effective to reflect generally vertically upwardly moving radiation downwardly to converge towards a focal region to add heat by radiation to marbles 20 in the marble stack above the heater strip 60. This heat added to the marbles 20 promotes both more uniform temperatures within the feeder 16 and an increase in the melting rate of the glass marbles 20.

In practice the surface 72 reflects radiation to concentrate in a central region of the upper melting region 62 where the marbles 20 are coldest. This normally means a location higher in the marble stack where colder, more recently supplied, marbles 20 are located.

In the embodiment shown in FIGS. 1-3 the top wall 22 is a uniformly thick arch-like structure made of an alloy of platinum. And the arch is a central symmetrical section of a shell having the shape of a paraboloid of revolution as indicated in FIG. 4. The circular base of the entire paraboloid shell is indicated in dashed lines in FIG. 4; the diameter of the circular base (denoted by reference letter D in FIG. 4) is equal to the length dimension of the feeder 10 (denoted by the reference letter L in FIG. 3).

The top or cover wall 22 is located so that the axis of rotation for the reflecting surface 72 is vertical.

The thickness of the cover wall 22 is usually thinner than the sidewalls of the feeder 16 (and hence thinner than the heater strip 60 too). So the heated top wall 22 usually has a lower temperature than the sidewalls 30, end walls 38 and the heater strip 60 during times the feeder 16 is electrically energized.

The reflecting surface 72 is a portion of the interior surface of a paraboloid of revolution shell. So radiant energy moving in a direction parallel to the axis of rotation of the surface 72 is reflected to converge or to concentrate at a focal point (represented by reference letter F in FIG. 3). And radiant energy moving in a direction generally parallel to the axis of rotation is also converged, but it is converged to a lesser extent towards a focal region or volume. Concentration of the reflected radiant energy becomes less as the direction of movement of the radiant energy becomes less parallel to the axis of rotation of the surface.

As mentioned the axis of rotation of the surface 72 is disposed vertically. Therefore, in the embodiment shown in FIGS. 1–3, it is the generally vertically upwardly moving radiant energy that upon reflection from the surface 72 is concentrated.

It is believed that during operation about 10 to 25 percent of radiant energy emitted interiorly of a feeder like the feeder 16 moves generally vertically upwardly to be reflected downwardly for convergence towards a focal region.

It is preferred that the reflecting surface be constructed as shown in FIG. 3 with its focal point F located below (outside) the reflecting chamber 70 and directly under the marble exit orifice 74 of the marble feed passageway. This region tends to be the coolest region in the feeder 16. And it is introduction of cold marbles in this region that can send thermal changes through the feeder 16.

In operation the radiation reflected by the reflection surface 72 converges towards the focal region centrally located in the marble melting region 62 above the perforated heating element 60 where unmelted marbles are located. As mentioned, this is the region that tends to be cooler than surrounding zones in the melting region 62. The marbles located in this central region tend to be cooler marbles. They are further from the conduction and radiation effected by the sidewalls 30, end walls 38 and heating strip 60. The heating of these marbles by radiation reflected from the surface 72 promotes a more uniform temperature throughout the melting section 62 during filament forming operations. And this improved heat distribution promotes more uniform thermal conditions for the molten glass in the reservoir region 64.

Polishing the reflecting surface 72 can improve its reflection capabilities. Accordingly, the surface 72 can be polished for improved performance.

FIGS. 5 and 6 show the top portion of another embodiment of a marble melting stream feeder according to the principles of the invention. Illustrated is an electrically heated feeder 100, which is like the feeder 16 except for its top region. The feeder 100 includes a top wall 102 with a hollow dome-like portion 104 that includes an upstanding marble feed tube 106 forming a marble supply opening 108.

The hollow dome-like portion 104 has the shape of a paraboloid of revolution with its outside base diameter D' (FIG. 5) equal to the width dimension W (FIG. 5) of the top of the feeder 100. The portion 104 has a uniform wall thickness (like the top wall 22 of the feeder 16) and has an internal curved radiation reflecting surface, denoted by the reference numeral 110. But in contrast to the radiation reflecting surface 72 of the feeder 16, the surface 110 has the form of a complete paraboloid of revolution, except for the outlet orifice 112 of the marble supply passageway 108.

The radiation reflecting surface 110, like the surface 72, forms a reflecting chamber 114 and has a focal point (denoted as F' in FIG. 7) located at the central region of the marble melting chamber of the feeder 100 above its marble heating element.

The operation of the reflecting surface 110 is like the reflecting surface 72.

FIG. 7 shows another hollow dome-like structure 150 for use with stream feeders. The structure 150 has an internal radiation reflecting surface 152 that has the shape of a hemisphere and that forms a reflecting chamber 154. So its focal point (denoted by the reference letter F'') is at the exit 156 of the reflecting chamber 154 immediately above the marble melting region of the feeder with which the structure 150 is used.

FIGS. 8–10 show the upper region of another marble melting feeder according to the principles of the invention. Illustrated in these figures is a stream feeder 170 that is like the stream feeder 16 except for construction of its upper region. The feeder 170 has an inverted funnel-like cover wall 172 comprising opposed sidewalls 174 and opposed end walls 176. These walls are joined together as converging wall relationship to form the cover wall 172, which is larger at its lower base region 178 than its upper top region 180. Further, the marginal regions between the converging walls are curved (see portions 182a, 182b and 182c). And the amount of the curved wall portions progressively increase so that the upper region is circular.

An upstanding tubular member 184 forms a marble supply passageway 186 that is in communication with an interior radiation reflection chamber 188.

The interior surface portions of the sidewalls 172 and end walls 174 (including curved portions 182) are joined together to form a reflecting surface 190. So the reflecting surface 190 is multifaceted. And the oblique angular relationship of these facets concentrates reflected radiation at a central region of the marble melting chamber 192 of the feeder 170 above its heater strip 194. The curved portions of the reflecting surface 190 assist in concentrating the reflected radiant energy.

In practice end walls 174 inclined from an angle of between 50° and 60° (angle A in FIG. 8) and sidewalls 172 inclined from an angle of between 20° and 30° (angle B in FIG. 9) have given good results for a feeder having a length of around 7 inches and a width of around 3 inches.

Electrical terminals 196 are on the end walls of the feeder 170.

FIGS. 11 and 12 show a glass filament forming operation using a stream feeder 216 that is like the stream feeder 16 except for its lower discharge region. The feeder includes the top wall cover 22 and heating strip 60. But unlike the feeder 16, the feeder 216 includes a bottom wall 220 having rows of depending orificed projections 222. These projections discharge molten glass streams 224 for attenuation into glass filaments 226 that are gathered into a strand 228 by a gathering shoe 230.

As shown the filaments 226 pass across a conventional sizing applicator 232 before the shoe 230 gathers the filaments 226 into the strand 228. The applicator normally applies a liquid sizing to the filaments.

A pulling device such as a textile winder or a pulling wheel advances the strand 228.

The invention provides improved production of filaments from heat-softened filament forming material in a chamber including a bottom wall having orifices for discharging streams of the heat-softened material. Radiant energy is reflected by a surface above the heat-softened body so that it is concentrated in a predetermined region in the chamber.

The reflecting surface can be simple or complex in shape, but it must be effective to concentrate reflected radiation.

While the reflecting surfaces disclosed herein form at least a portion of the ceiling or internal cover surface of a feeder, it may be advantageous to use a reflecting surface that is not part of a feeder top or cover wall arrangement. And there may be times when it is advantageous to concentrate the reflected radiation in a region within a heat-softened body within the melting chamber. For example, the reflected radiant energy might be reflected to concentrate in a region of the body of molten glass above a heating strip (e.g. heating strip 60 of feeder 16) within a feeder.

Then too, the principles of the invention may be useful in heating other forms of mineral material besides portions of glass in a filament forming operation. For example, the invention might be useful in heating raw batch material supplied to a heat-softened body of filament forming material such as molten glass.

I claim:
1. A feeder for supplying molten glass comprising:
   a. sidewalls;
   b. a bottom wall having at least one orifice for discharging molten glass;
   c. a resistance element within said feeder to convert unmelted glass to a molten condition;
   d. a top wall adapted to reflect vertically upwardly moving heat from molten glass in said feeder to a single focal point in said feeder above said resistance element; and,
   e. conduit means for introducing unmelted glass into said feeder.

2. The apparatus of claim 1 in which said top wall defines a paraboloid of revolution.

3. The apparatus of claim 1 in which said conduit means is on a common vertical line with said focal point.

4. The method of supplying streams of molten glass comprising:
   a. introducing unmelted glass into a feeder having a bottom wall which has orifices through which streams of molten glass are discharged;
   b. heating said unmelted glass with a resistance element positioned within said feeder to form a body of molten glass; and,
   c. reflecting vertically upwardly moving heat from one or a plurality of walls of said feeder to concentrate said heat at a single focal point positioned in said feeder above said resistance element.

5. The method of claim 4 in which said heat is concentrated at the locus in said feeder at which the coolest of said unmelted glass is positioned.

6. The method of claim 5 in which said heat is reflected from a surface which is a paraboloid of revolution.

* * * * *